(12) United States Patent
Faus et al.

(10) Patent No.: US 8,751,098 B2
(45) Date of Patent: Jun. 10, 2014

(54) METHOD OF MONITORING CANBUS INFORMATION

(75) Inventors: Juan Faus, San Diego, CA (US); Satish Ram, Poway, CA (US)

(73) Assignee: Omnitracs, LLC, San Diego, CA (US)

( * ) Notice: Subject to any disclaimer, the term of this patent is extended or adjusted under 35 U.S.C. 154(b) by 1346 days.

(21) Appl. No.: 12/020,464

(22) Filed: Jan. 25, 2008

(65) Prior Publication Data

US 2009/0192662 A1    Jul. 30, 2009

(51) Int. Cl.
*G01M 17/00*    (2006.01)

(52) U.S. Cl.
USPC ....... 701/32.7; 701/29.1; 701/29.6; 701/31.4; 701/31.5

(58) Field of Classification Search
USPC ........... 701/29.1, 29.6, 29.8, 29.9, 20.3, 31.4, 701/31.5, 31.7, 32.7
See application file for complete search history.

(56) References Cited

U.S. PATENT DOCUMENTS

| | | | |
|---|---|---|---|
| 5,673,305 A | 9/1997 | Ross | |
| 6,665,601 B1 | 12/2003 | Nielsen | |
| 6,728,603 B2 * | 4/2004 | Pruzan et al. | 701/1 |
| 6,801,942 B1 * | 10/2004 | Dietrich et al. | 709/225 |
| 7,046,638 B1 * | 5/2006 | Klausner et al. | 370/313 |
| 7,149,206 B2 * | 12/2006 | Pruzan et al. | 370/349 |
| 7,155,321 B2 * | 12/2006 | Bromley et al. | 701/29.6 |
| 7,305,289 B2 * | 12/2007 | Gessner et al. | 701/34.3 |
| 7,324,550 B2 * | 1/2008 | Klose et al. | 370/466 |
| 7,346,370 B2 * | 3/2008 | Spaur et al. | 455/556.1 |
| 7,380,023 B2 * | 5/2008 | Fukushima | 709/250 |
| 7,542,879 B2 * | 6/2009 | Grichnik et al. | 702/189 |
| 7,725,630 B2 * | 5/2010 | McClure et al. | 710/72 |
| 7,787,969 B2 * | 8/2010 | Grichnik et al. | 700/48 |
| 7,912,602 B2 * | 3/2011 | Sells et al. | 701/31.7 |

(Continued)

FOREIGN PATENT DOCUMENTS

| | | |
|---|---|---|
| DE | 10237715 A1 | 2/2004 |
| DE | 10313467 A1 | 10/2004 |

(Continued)

OTHER PUBLICATIONS

Y. Wang, F. Chu, Y. He and D. Guo, "Multisensor Data Fusion for Automotive Engine Fault Diagnosis," Tshinghua Science and Technology, vol. 9, No. 3, pp. 262-265, Jun. 2004.*

(Continued)

*Primary Examiner* — Thomas Black
*Assistant Examiner* — Peter D Nolan
(74) *Attorney, Agent, or Firm* — Arent Fox LLP (57) ABSTRACT

The specification and drawing figures describe and show a method and system of monitoring CANbus information across an integrated wireless equipment management system and a mobile wireless communications system. The CANbus, mounted in a vehicle, provides communication and diagnostic information among vehicle components that, because the CANbus also is operatively connectable to the integrated wireless equipment management system, may be transmitted across that system. The CANbus includes one or more original parameters associated with sensors that are converted into virtual sensors to provide selective vehicle information to a terminal of the integrated wireless equipment management system.

33 Claims, 8 Drawing Sheets

(56) References Cited

U.S. PATENT DOCUMENTS

| | | |
|---|---|---|
| 8,032,668 B2 * | 10/2011 | McClure et al. ............... 710/16 |
| 8,036,764 B2 * | 10/2011 | Grichnik et al. ............... 700/48 |
| 2003/0023377 A1 | 1/2003 | Chen et al. |
| 2003/0114980 A1 | 6/2003 | Klausner et al. |
| 2005/0251604 A1 | 11/2005 | Gerig |
| 2006/0111825 A1 * | 5/2006 | Okada et al. .................. 701/48 |
| 2006/0129290 A1 | 6/2006 | Zimmerman et al. |
| 2006/0176193 A1 | 8/2006 | Wraight |
| 2007/0010922 A1 * | 1/2007 | Buckley ......................... 701/29 |
| 2007/0086482 A1 | 4/2007 | Pruzan et al. |
| 2008/0186870 A1 * | 8/2008 | Butts et al. ................... 370/252 |
| 2009/0216827 A1 * | 8/2009 | Hirase et al. ................. 709/201 |

FOREIGN PATENT DOCUMENTS

| | | |
|---|---|---|
| DE | 102005055173 A1 | 5/2006 |
| EP | 1069731 A2 | 1/2001 |
| EP | 1136325 A2 | 9/2001 |
| GB | 2360500 A | 9/2001 |
| WO | WO0019170 A1 | 4/2000 |

OTHER PUBLICATIONS

International Search Report and Written Opinion—PCT/US2009/031639—ISA/EPO—Aug. 4, 2009.

* cited by examiner

METHOD OF MONITORING CANBUS INFORMATION

FIELD OF TECHNOLOGY

The new and useful method, system, and apparatus disclosed, illustrated and claimed in this document pertain generally to monitoring information across a vehicle bus. More particularly, the method, system and apparatus for monitoring CANbus information is directed to expanding both the quantity and quality of vehicle operation and performance criteria monitored by a vehicle owner, or asset manager as a result of combining performance parameters associated with one or more sensors on a CANbus control bus to obtain virtual sensor data to supplement vehicle operation and performance criteria transmitted for analysis across an integrated, wireless equipment management system.

BACKGROUND

Mobile asset management is a major concern in various transportation industries such as industrial heavy equipment, trucking, railroad, rental equipment, and similar industries. In the industrial heavy equipment and trucking industries, for example, an asset manager may desire to track the status and location of several different, assets in a fleet. An asset manager may want to know, for example, if a remote vehicle is in service, where the vehicle is located, what is happening in connection with the vehicle's operation, how a remote vehicle operator is reacting to conditions confronting fee vehicle, as well as a wide range of variable vehicle operation and performance criteria.

To enable an asset manager to monitor a remote vehicle's states, including the vehicle's operation and performance, a system for at least two-way communications between one or more customer base stations, such as a vehicle dispatcher or asset manager, and a remote vehicle, is increasingly in demand. Some objectives of such a system include not only facilitating communications, but also data development, data storage, and receipt and transmissions of information and reports in connection with the remote vehicle. At least one integrated wireless equipment management system to accomplish those objectives has been developed which includes several useful features. An exemplary integrated wireless equipment management system used in connection with industrial heavy equipment is QUALCOMM Incorporated's GlobalTRACS™ system. In combination with a mobile wireless communications system, the integrated, wireless equipment management system allows customers to track and collect vehicle data, operator driving data, and transportation network data; allows an asset manager to monitor various problems confronted by vehicle operators in connection with operation of a remote vehicle within a transportation network; and allows an asset manager to monitor vehicle operating and deployment conditions useful to the asset manager.

GlobalTRACS™, which is, as indicated, an integrated wireless equipment management system, meets unique requirements of the construction, industry trades by providing a system, that automatically monitors a wide range of information and data, that the system converts into actionable information, allowing an asset manager to acquire knowledge needed to proactively manage remote industrial heavy equipment. The system therefore maximizes equipment utilization, enhances productivity, reduces costs, and decreases risk of loss from theft and unauthorized use, and increases profitability. In addition, the GlobalTRACS™ system may be integrated into back-office systems to further improve productivity and streamline processes.

GlobalTRACS™ terminals, and perhaps other an integrated wireless equipment management systems, use sensors on a vehicle to achieve a number of equipment monitoring functions that include at least: (a) detecting when a sensor is breached, that, is, when a sensor exceeds a configurable, threshold for longer than a configurable time; (b) detecting a sensor's return to normal, that it when the sensor reports operating within a configurable threshold for longer than a configurable normal time; (c) supporting a configurable hystereses, or retardation of an effect as conditions change, in connection with a limit threshold,; (d) detecting a breach that may be above or below a threshold defined by a configurable parameter; (e) generating one or more status reports or alert messages if a sensor state changes to breached; (f) generating one or more status reports or alert messages as a sensor returns to a normal state; and (h) generating and maintaining reports about the accumulated time a sensor has remained in a breached state.

In addition, efforts to achieve and ensure communications between and among remote vehicles and asset managers also have been enhanced by including with a mobile wireless communications system a position determining system such as a Satellite Positioning System ("SPS") and/or a terrestrial positioning system. Alternatively, systems such as Orbcomm, among others, may be used for satellite communications, while a GPS system, as defined in this document, may be used as a positioning system. A mobile wireless communications system, therefore, may be in part terrestrial, and may be used either independently of an SPS system, or in conjunction with an SPS system, such as the GlobalTRACS™ system, among others. Such systems are capable of processing and managing message traffic at least between an asset manager and a vehicle. Such systems also generally include software and programs used by an asset manager to receive and send information over the wireless network, and perform a range of additional functions over the Internet and or World Wide Web. In addition, a mobile wireless communications system also is capable of using alternative channels of communications that allow use of conventional computers that may not be wireless.

Vehicles that use an integrated wireless equipment management system capable of communicating across a mobile wireless communications system usually are equipped with an electrical bus (occasionally spelled "buss"). A bus or buss is a physical electrical interface capable of allowing many devices or components to share the same electric connection. An electrical bus allows signals to be transferred between and among devices, in turn allowing information or power to be shared. A bus often takes the form of an array of wires that terminate at a connector designed to allow one or mere devices to be plugged onto the bus.

Accordingly, a vehicle bus is an electronic communications network that interconnects components in a vehicle. Because of requirements unique to various types of vehicles, including as non-exclusive examples environmental constraints, cost, reliability and real, time characteristics, computer networking technologies such as Ethernet and TCP/IP rarely are used in combination with a vehicle bus. Typical of vehicle electronic components that communicate with each other on and across a vehicle bus are engine control modules, also referred to as electronic control units or an electronic control module ("ECM" or "ECU," but collectively in this document "ECM"); transmission control modules ("TCM"); and anti-lock brake system modules ("ABS"), among others. An ECM may control a vehicle's fuel injection system, ignition timing, and or an idle speed control system. Depending on design, an ECM also may interrupt operation of the air-conditioning system, or may control power to a fuel pump through a control relay. Generally, an ECM includes an 8-bit microprocessor, random access memory ("RAM"), read only memory ("ROM"), and an input/output interface, among other components.

Development of vehicle network technology has advanced in part because of government regulations, especially in the United States, that have been imposed on vehicle operation to make vehicles responsive to environmental goals. For example, following imposition of limitations placed on gases emitted from automobiles, achieving the environmental standards became attainable only through use of on-board vehicle electronic and computing devices. Such on-board electronic devices also contribute to vehicle performance, ease of manufacture, and cost effectiveness.

An ECM typically receives input from one or more sensors. A sensor may monitor speed, temperature, pressure, and similar conditions, providing data useful in computations of other data. Actuators also may be used to enforce or implement actions determined by an ECM in response to such sensor data, such as turning a cooling fan on, changing a gear, and similar actions. Modules often need to exchange data among themselves during normal operation of a vehicle. For example, an engine may need to inform, a transmission about engine speed, an ABS module may need to inform the engine and transmission that one or more wheels are locking, and similar information. Accordingly, a modern vehicle network has become a medium of data exchange.

However, wiring a vehicle to operatively interconnect all modules to achieve such data exchanges presents extremely difficult wiring problems. In addition, it may be desirable to monitor performance parameters associated with one or more sensors on vehicles having different or varying features and characteristics. It is not atypical for an asset manager to be concerned with more than one vehicle, and the vehicle operation and performance criteria of those vehicles. Responding to such variability presents complicated wiring diagnoses.

In response to those problems, vehicle manufacturers install electronic networks in vehicles. Electronic networks expedite vehicle manufacture. Electronic networks also assist in vehicle maintenance. Electronic networks further provide the capability and flexibility of allowing addition or removal of vehicle options without affecting the vehicle's entire wiring architecture. Today, each module, or node, on the vehicle network is a control module, controlling specific components related to specific functionalities, and capable of communicating with the other modules as necessary, using a standard protocol, over the on-board vehicle network.

To facilitate the use of electronic networks in vehicles, vehicle busses were developed. One such common vehicle bus includes a controller area network ("CAN"). A CANbus has proven to be a relatively inexpensive, low-speed serial bus for interconnecting automotive components. CAN is a serial bus standard for connecting at least ECM's. CAN was initially created for the automotive market as a vehicle bus, but now is available for a number of vehicles including heavy industrial equipment.

To further enhance use of a CANbus in a vehicle electronic network, standards have been developed. The CAN data link layer protocol is standardized in ISO 11898-1 (2003). This standard describes mainly the data link layer and some aspects of the physical layer of the ISO/OSI. All other protocol layers are left to a network designer's choice, a fact that in part introduces a problem solved by the method, system, and apparatus described, illustrated and claimed in this document.

To be compatible with the CAN standard, an implementation must accept other standard formats; one such standard is SAE J1939.

SAE J1939 also is a vehicle bus standard used for communication and diagnostics among vehicle components, particularly on heavy duty vehicles in the United States. SAE J1939 defines five layers in the 7-layer OSI network model, and this includes the CAN 2.0b specification, using a 29-bit "extended" identifier for the physical and data-link layers. The session and presentation layers are not part of the specification. The J1939 standard defines an index called a Parameter Group Number ("PGN") that is embedded in the message's 29-bit identifier. A PGN identifies a message's function and associated data. J1939 seeks to define standard PGN's to encompass a wide range of automotive purposes. For example, there exist predefined PGN's for information such as engine rpm.

However, each vehicle manufacturer is provided optional PGN's for the manufacturer's proprietary use. Thus, a range of PGN's, identified as $00FF00_{16}$ through $00FFFF_{16}$ inclusive, is reserved for proprietary use. The ability to include proprietary parameters in connection with various vehicles introduces yet another problem solved by the method, system, and apparatus described, illustrated and claimed in this document; proprietary parameters, those proprietary to a vehicle manufacturer, may he unknown to a vehicle user or asset manager.

The PGN is a combination of the reserved bit (always 0), the data page bit (currently only 0 because 1 is reserved for future use), the PDU Format ("PF"), and PDU Specific ("PS"). PDU stands for Protocol Data Unit, and may also be read as the message format. The PF and PS both are a byte, or 8-bits, long. The PS is dependent on the value in the PF field. If the PF value is between 0 and 239, the PS field will contain the destination address of the node that will receive the message. If an address called the Global Address, or $FF_{16}$, is used, all nodes on the CANbus will receive a message. This type of message, one that can be directed to a specific ECM on the CANbus by sending the message to its address, is called, a PDU1 message.

If, however, a PF field is between 240 and 255, then the PS field will contain a Group Extension ("GE"). The GE provides a larger set of values to identify messages that are broadcast to all nodes on the network. This type of message, one that is sent to all ECM's on the CANbus, is called a PDU2 message.

The PGN uniquely identifies the Parameter Group ("PG") that is being transmitted in the message. Each PG, or a grouping of specific parameters, has a definition that includes the assignment of each parameter within the 8-byte data field, the transmission rate, and the priority of the message. The structure of a PGN currently permits a total of up to 8,672different parameter groups to be defined per page. When an ECM receives a message, the ECM uses the PGN in the identifier to recognize the type of data sent in the message.

The J1939 standard also describes other parameters used in the J1939 network. A Suspect Parameter Number ("SPN") is a number that has been assigned by the SAE committee to a specific parameter. Each SPN includes data length, in bytes; data type; resolution; offset; range; and a tag, or label, for reference. One or more SPN's that share common characteristics will be grouped into a Parameter Group ("PG") transmitted to the network using the same PGN. The message may also include a source address ("SA"), information about raw breach threshold, hysteresis, starting position, and the number of bits, units, factor, and offset.

On a J1939 network, each vehicle component or device has a unique address. Each message sent by a component or device contains a source address. 255 addresses are possible. Each device type has a preferred address. Before a device may use an address, it must register itself on the CANbus, a procedure called "address claiming," in which the device sends an "AddressClaim" parameter group with the desired source address. The PG contains a 64-bit device name. The device name contains some information about the device and describes its function. Examples of such messages are illustrated in this document as FIGS. 4A-4C.

Thus, the SAE J1939 standard defines a large number of parameters that may or may not be available on a CANbus installed on a particular vehicle. Vehicle manufacturers and equipment manufacturers for vehicles decide which parameters to support. Vehicle manufacturers and equipment manufacturers for vehicles may also add unique proprietary parameters.

Accordingly, although CANbus and the standards that have been developed, to enhance use of the CANbus and its associated sensors combine to provide elegant solutions for what they were designed to do, they include limitations for vehicle owners and asset managers seeking to monitor a number of vehicles that may have varying operation and performance criteria.

At least one limitation arises from the fact that original equipment manufacturers deploy a CANbus system that is vehicle-specific. The CANbuses of most industrial heavy equipment vehicles, such as construction equipment and construction vehicles, often are limited to specific performance parameters, and may not include performance parameters sought to be monitored by a vehicle owner and/or assets manager. Regarding industrial heavy equipment such as construction equipment, significant additional complexity arises. SAE J1939 is the vehicle network communication standard used for communication and diagnostics by industrial heavy equipment, such as construction equipment and the heavy duty truck industry, predominantly in the United States. Proprietary standards may therefore affect usefulness of an integrated wireless equipment management system. If CANbus information cannot be monitored due to proprietary standards that the integrated wireless equipment management system cannot read or react to, an asset manager may be usable to monitor vehicle operation and performance criteria across an integrated wireless equipment management system.

At least one problem, therefore, to be solved is to provide a method, system, and apparatus that is capable of monitoring CANbus information by a vehicle owner or asset manager that overcomes the limitations of a CANbus due to undisclosed proprietary and non-public parameters associated with a particular vehicle's CANbus.

SUMMARY

The apparatus, system, and method disclosed, illustrated, and claimed in this document address the above-stated needs by developing data to supplement vehicle operation and performance criteria transmitted for analysis across an integrated wireless equipment management system and a mobile wireless communications system.

The method and system of monitoring CANbus information includes an integrated wireless equipment management system. The integrated wireless equipment management system is capable of receiving, storing, processing and transmitting vehicle data across a mobile wireless communications system. The method and system of monitoring CANbus information also includes a bus, more specifically a CANbus (collectively in this document, a "CANbus.") The CANbus is mountable in a vehicle. The CANbus provides communication and diagnostic information among, vehicle components. The CANbus also is operatively connectable to the integrated wireless equipment management system. The CANbus includes one or more original parameters. Each original parameter provides vehicle data as provided in a SAE standard, generally the SAE standard J1939. The original parameters may monitored by the CANbus as well as by the integrated wireless equipment management system. Users of the integrated wireless equipment management system, such as asset managers, often want selective vehicle data different than vehicle data provided by original parameters of the CANbus. The method and system of monitoring CANbus information is capable of configuring and reconfiguring the original parameters into virtual sensors capable of providing selective vehicle information to the integrated wireless equipment management system.

It will become apparent to one skilled In the art that the claimed subject matter as a whole combines to result in a number of unexpected advantages arid utilities. Both the structure and co-operation of structure of the method of monitoring CANbus information will become apparent to those skilled in the art when read in conjunction with the following description, drawing figures, and appended claims.

The foregoing has outlined broadly the more important features of the invention to better understand the detailed description that follows, and to better understand the contributions to the art. The method of monitoring CANbus information is not limited in application to the details, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, fee conception on which this disclosure is based may be used as a basis for designing other structures, methods, and systems. The claims, therefore, include equivalent constructions. Further, the abstract associated with this disclosure is intended neither to define the method of monitoring CANbus information, which is measured by the claims, but is not intended to limit the scope of the claims.

The novel features of the method of monitoring CANbus information are best understood from the accompanying drawing, considered in connection with the accompanying description of the drawing, in which similar reference characters refer to similar parts, and in which:

To the extent that the numerical designations in the drawing figures include lower case letters such as "a,b," such designations include multiple references, and the letter "n" in lower case such as "a-n" is intended to express a number of repetitions of the element designated by that numerical reference and subscripts.

DETAILED DESCRIPTION

Definitions

The term, "vehicle" as used in this document means motorized vehicles including industrial heavy equipment generally associated with construction industry trades, agricultural vehicles and machines, trucks, buses, mobile hydraulics, trains, ships, boats, and the like, as well as other assets that may be tethered to such vehicles, including containers, tractors, trailers, and similar assets.

The term "selective vehicle information" means vehicle data selected and/or identified to be monitored by an operator and/or asset manager using an integrated wireless equipment management system to monitor specific information about a vehicle, including a vehicle's condition, that may not be included among the original parameters installed on a bus such as a CANbus.

The term "original parameter" means a parameters provided for use with a CANbus by a manufacturer of a vehicle, sometimes referred to as an original equipment manufacturer ("OEM"), selected from a large number of possible parameters including, but not limited to, parameters provided for in SAE Standard J1939.

The term "determinable" in the phrase "determinable original parameter" means a parameter that can be determined or ascertained from information available from a vehicle manufacturer.

The term "remote" means an object like a vehicle that is removed in space from another systemically interrelated but distant object or objects like an asset manager using an integrated wireless equipment management system capable of receiving, processing, sending, and storing vehicle data without necessarily coming into physical contact with one another.

The term "mobile wireless communications system: means a wireless communications system adapted at least to communicate with a remote vehicle from a base station operated by an asset manager.

The term "integrated wireless equipment management system" means a communications system operatively connected across a mobile wireless communications system that includes a vehicle on-board mobile computing platform. The integrated wireless equipment management system is capable of at least tracking, communicating with, and monitoring a vehicle and vehicle conditions by mobile two-way satellite and/or terrestrial means to enable an asset manager to monitor vehicle data of a remote vehicle, vehicle operator data, a transportation network, and vehicle deployment conditions. QUALCOMM Incorporated's GlobalTRACS™ system is an exemplary integrated wireless equipment management system that may be used in conjunction with a mobile wireless communications system, to monitor vehicle data across a mobile wireless communications system. In general the integrated wireless equipment management system, includes an array of operatively connected communication devices adapted to receive and transmit at least electromagnetic signals across a wireless communications system without cables, using infrared light and radio signals, and also includes a telecommunications system in which electromagnetic waves, rather than some form of wire, carry the signal over all or part of the communication path. Messages may be routed through a provider center, a location from which the messages may be routed to a third party customer of the provider who may operate the provider center as an asset manager, and may also include third party applications to achieve monitoring of assets unique to the customer.

The term "SPS" means any satellite positioning system operatively connected to the integrated wireless equipment management system that may receive and transmit signals including, location parameters, from satellites, including satellites that are part of the Global Positioning System ("GPS"), Galileo, GLONASS, NAVSTAR, GNSS, a system that uses satellites from a combination of these systems, or any satellite positioning system subsequently developed (collectively referred to generally in this document as a Satellite Positioning System, or "SPS." As used in this document, an SPS also includes pseadolite (pseudo-satellite) systems. As a person of skill in the art will appreciate, an integrated wireless equipment management system also may include terrestrial components that may be used either independently of an SPS system, or in conjunction with an SPS system. A terrestrial-based position determination system may be used, as one non-exclusive example, in connection with Assisted GPS equipment and Local Positioning Systems ("LPS") systems that may be associated with RFID and a Wi-Fi RSSI system. As a person skilled in the art also will appreciate, however, the technology of SPS and terrestrial systems is constantly being improved. New as yet unknown technologies for location determination may he developed that may he used with the method of monitoring CANbus information of this document, and are included in the meaning of "SPS."

The term "location" and "position" mean the physical and geographic location of one or more remote vehicles and one or more asset managers determined by any technique, technology, or system, or any combination of techniques, technologies, or systems, known or as yet unknown, for determining location parameters. Currently, such techniques and apparatus used for various SPS systems are used in combination with a wireless wide area network (WWAN), a wireless local area network (WLAN), a wireless personal area network (WPAN), and so on. The term "network" and "system" are often used interchangeably, A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, among others. A CDMA network may implement one or more radio access technologies such as cdma2000, Wideband-CDMA (W-CDMA), among others. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3CPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

The term "asset manager" means a user of an integrated wireless equipment management system, and any agent designated by the user, to manage, monitor and communicate with a vehicle and/or vehicle operator across the integrated wireless equipment management system and a mobile wireless communications system.

The term "transportation network" means any combination and permutation of a system of transit such as a road and highway system considered part of a route of travel from one place to another, often but not always interconnected into a grid or pattern.

The term "vehicle data" means at least information about vehicle operating and/or non-operating conditions, vehicle performance criteria, and vehicle deployment conditions, and may also include, without limitations, transportation network conditions, vehicle weight, vehicle contents, geographical locations across a transportation, network, proposed interim and final destinations of the vehicle within a transportation network, and payloads and payload capacity.

The term "exemplary" means serving as an example, instance, or illustration; any aspect described in this document as "exemplary" is not intended to mean preferred or advantageous over other aspects.

DESCRIPTION

As shown by cross-reference between FIGS. 1-6, a method of monitoring CANbus information is provided that, in its broadest context, includes an integrated wireless equipment management system. The integrated wireless equipment management system is capable of receiving, storing, and processing vehicle data across a mobile wireless communications system. The method and system of monitoring CANbus information also includes a bus, more specifically a CANbus. The CANbus is mountable in a vehicle. The CANbus provides communication and diagnostic information to and among vehicle components. The CANbus also is operatively connectable to the integrated wireless equipment management system. The CANbus includes one or more original parameters. Each of the original parameters provides vehicle data as provided in a SAE standard including the SAE standard J1939. The original parameters may monitored by the CANbus as well as by the integrated wireless equipment, management system. Users of the integrated wireless, equipment management system, such as asset managers, often want selective vehicle data that is different than the vehicle data provided by the CANbus original parameters. The method and system of monitoring CANbus information is capable of configuring and reconfiguring the original parameters into virtual, sensors capable of providing selective vehicle information to the integrated wireless equipment management system.

Figure 1A:
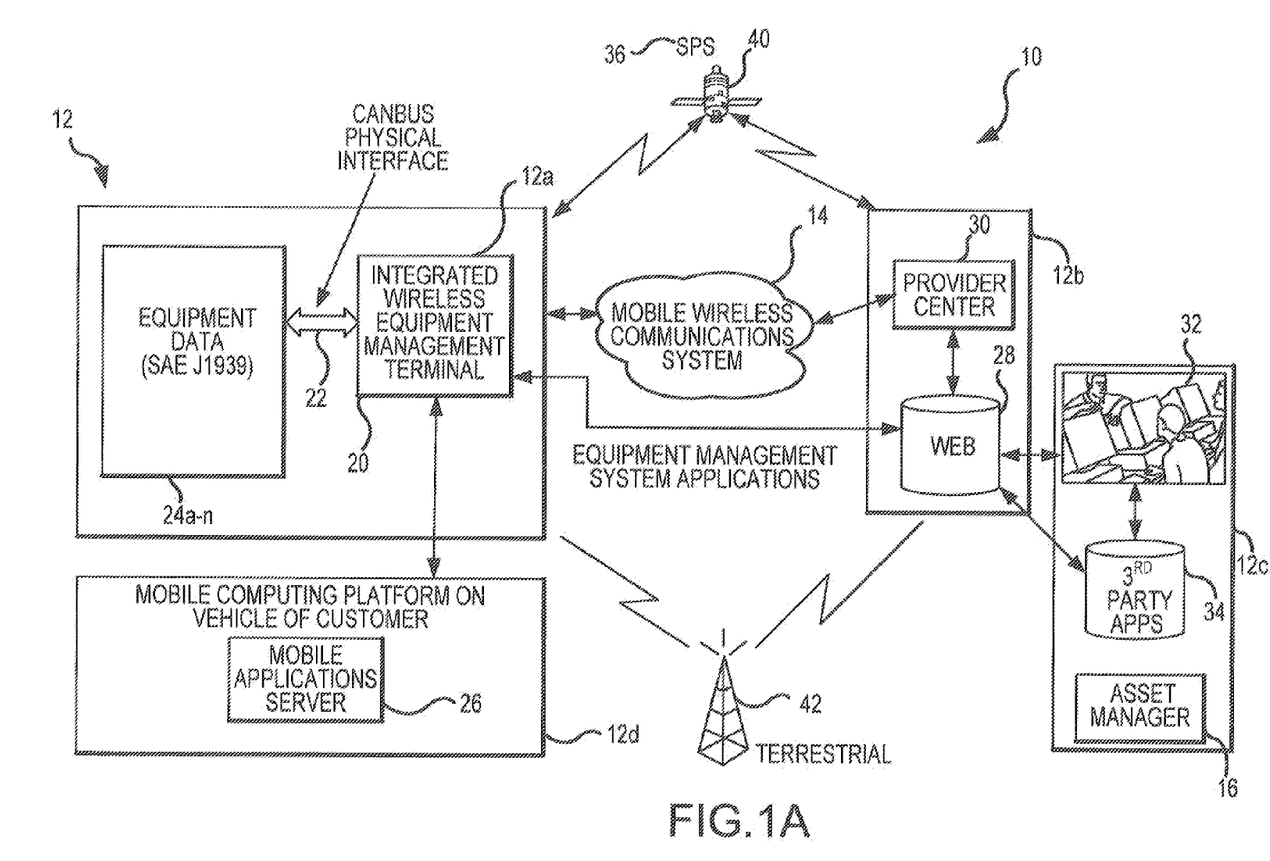
FIG. 1A of the drawing is a block diagram of the method of monitoring CANbus information.
Figure 1B:
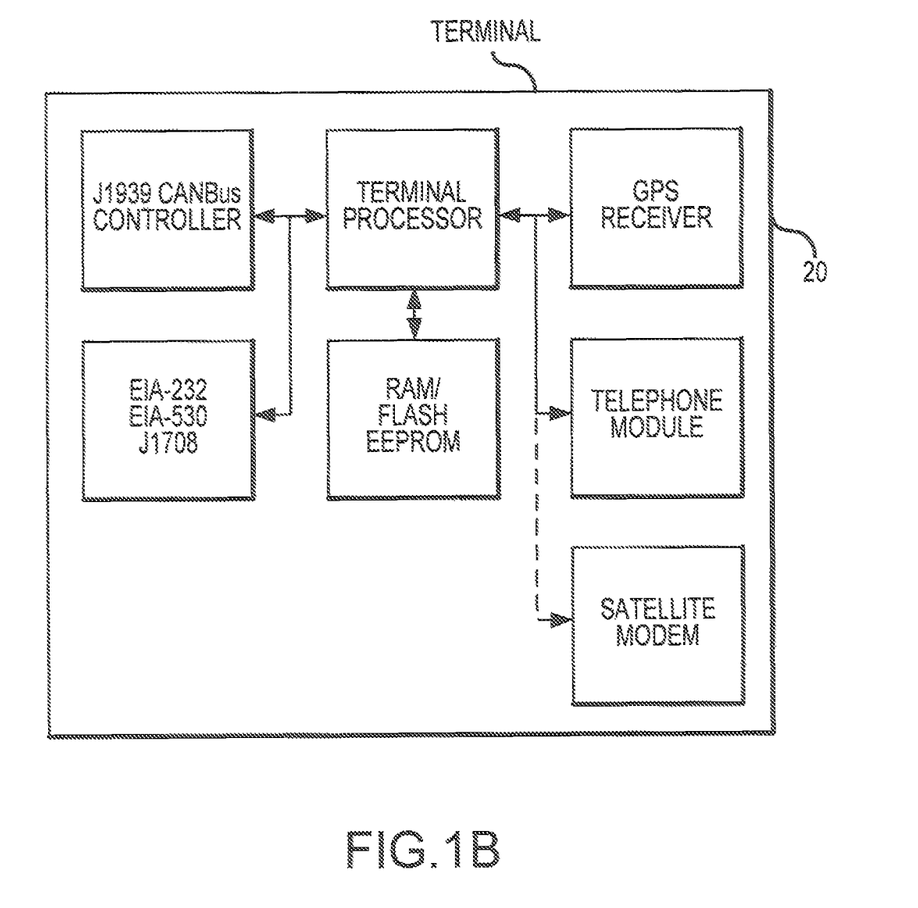
FIG. 1B is a block diagram illustrating one aspect of a terminal.
Figure 2:
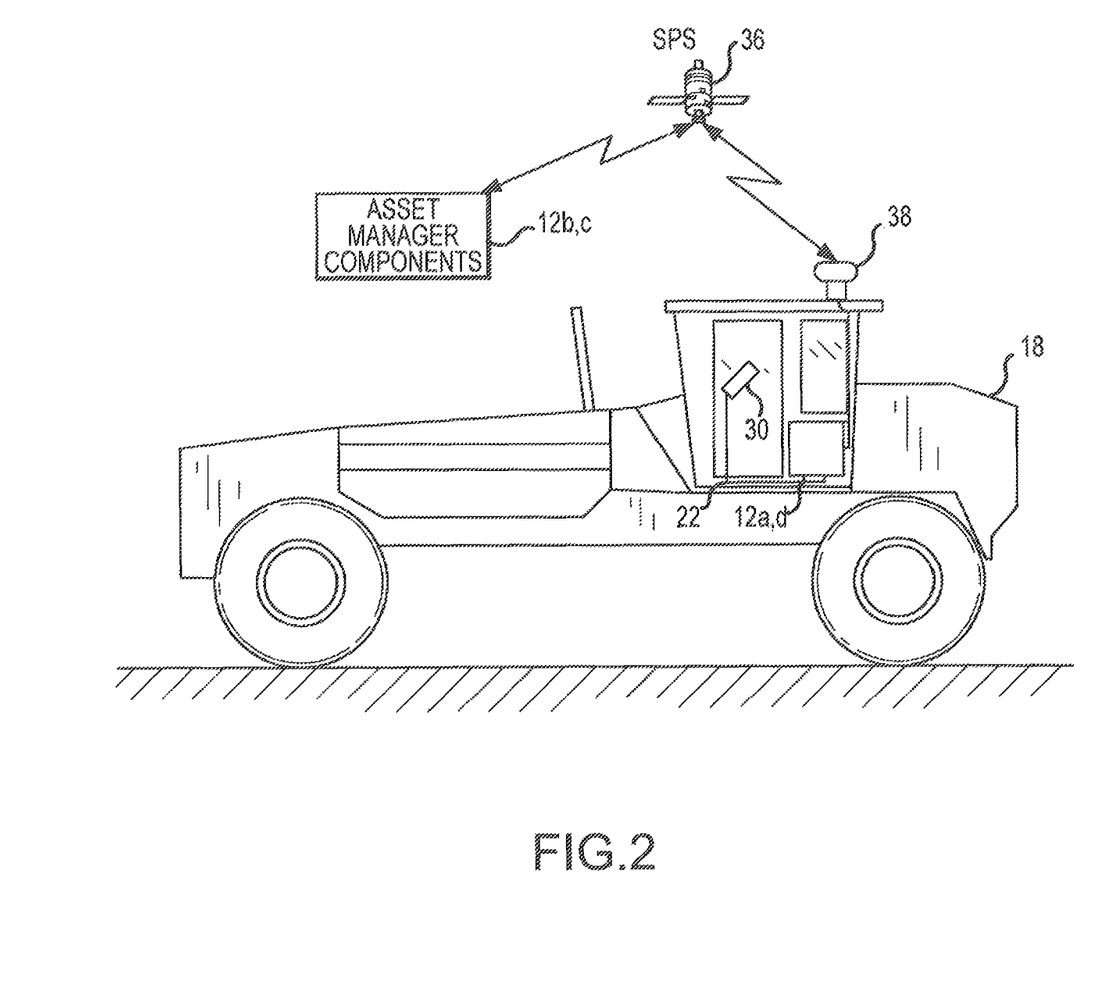
FIG. 2 is a side view of a construction vehicle illustrating selected components of the method of monitoring CANbus information.

More specifically, as illustrated in FIG. 1A, a method of monitoring CANbus information 10 includes an integrated wireless equipment management system 12a-n. The integrated wireless equipment management system 12a-n is capable of receiving, storing, and processing vehicle data across a mobile wireless communications system 14. The integrated wireless equipment management system 12a-n includes a variety of components, but a person skilled in the art will appreciate that the method of monitoring CANbus information 10 is not limited by the illustrative components, which may vary depending on the desired applications and scope of monitoring desired by a customer illustrated in FIG. 1A as an asset manager 16. The asset manager 16 uses the integrated wireless equipment management system 12a-n to monitor vehicle data associated with a vehicle 18 illustrated in FIG. 2. Also Illustrated in FIG. 1A is a terminal 20 of the integrated wireless equipment management system 12a-n, which is mounted on vehicle 18 as illustrated in FIG. 2, and is operatively connected to a CANbus 22. In at least one aspect, as illustrated in FIG. 1B, terminal 20 includes a terminal processor operatively connectable to a CANbus controller, to a wireless communications system, and to a position determination receiver and/or transceiver. Terminal 20 also may include a variety of other means for receiving, processing, and transmitting data and information as shown in FIG. 1B. CANbus 22 is, in turn, operatively connected to and across one or more sensors (not shown) in vehicle 18 that include one or more original parameters 24 as defined in this document and illustrated in FIG. 1A as "Equipment Data associated with SAB J1939," also described in this document.

The CANbus 22 provides communication and diagnostic information among vehicle components and sensors and possibly actuators (not shown). As indicated, however, the CANbus 22 also is operatively connectable to the integrated wireless equipment management system 12a-n. As indicated, the CANbus 22 includes one or more original parameters 24. Each original parameter 24 provides vehicle data as provided in at least SAE J1939. The integrated wireless equipment management system 12a-n is designed to monitor the original parameters 24 associated with CANbus 22 across the mobile wireless communications system 14.

However, users of the integrated wireless equipment management system 12a-n, such as an asset manager 16, often want selective vehicle data, as defined in this document, in addition to and/or that differ from the vehicle data provided by the CANbus 22 original parameters 24. The method and system of monitoring CANbus information 10 is capable of configuring and reconfiguring the original parameters 24 into virtual sensors capable of providing selective vehicle information to the integrated wireless equipment management system 12a-n.

As also illustrated in FIG. 1A, the integrated wireless equipment management system 12a-n may include an onhoard mobile computing platform 12d mounted on vehicle 18. Mobile computing platform 12d may include a mobile applications server 26 used to receive and transmit messages across the mobile wireless communications system 14 to other components of the integrated wireless equipment management system 12a-n. For example, as illustrated, the integrated wireless equipment management system 12a-n also includes one or more World Wide Web ("Web") applications 28 operatively connected via the integrated wireless equipment management system 12a-n to a provider center 30. An asset manager 16 can monitor messages from the CANbus 22 of vehicle 18 sent from components of the integrated wireless equipment management system 12a-n across a mobile wireless communications system 14 to the provider center 30 and to the asset manager 16 who may monitor vehicle data of vehicle 18 using any number of computer assisted components 32 as illustrated in FIG. 1A. The asset manager 16 also may add desired third party applications 34 to assist in monitoring vehicle data of vehicle 18. As also illustrated in FIG. 1A, the communications between vehicle 18 and provider center 30 sent across mobile wireless communications system 14 using the integrated wireless equipment management system 12a-n may be facilitated using SPS technology 36. Thus, a radome transmitter 38, or similar transmitter as illustrated in FIG. 2, may be mounted on vehicle 18 to transmit messages from the CANbus 22 to the asset manger 16. As also illustrated in FIG. 1A, alternative systems may be used for satellite communications, such as an Orbcomm system (not shown), a GPS System 40, and/or a terrestrial system 42, to receive and transmit CANbus information and data between vehicle 18 and the computer assisted components 32 being monitored by an asset manager 16.

Both in the mobile computing platform 12d, and in the provider center 30 where die asset manager 16 monitors CANbus 22 messages received across the integrated wireless equipment management system 12a-n, a number of computer assisted components 32 may be included. As illustrated, in FIG. 3, the integrated wireless equipment management system and/or mobile computing platform 12d may include a data processing system 44. As illustrated, the data processing system 44 may include a variety of components to enable the integrated wireless equipment management system 12 to send and receive data and information, including vehicle data, to a terminal 20 of die integrated wireless equipment management system 12 to enable an asset manager 16 to monitor at least one vehicle 18 and the vehicle data associated with vehicle 18. A person skilled in the art will appreciate that all information and data generated, received, stored, and transmitted between the on-board computing platform 12d of the integrated wireless equipment management system 12 and the terminal 20 of the integrated wireless equipment management system 12 across a mobile wireless communications system 14 may be received, stored, processed, and transmitted to a computer or similar apparatus.

Figure 3:
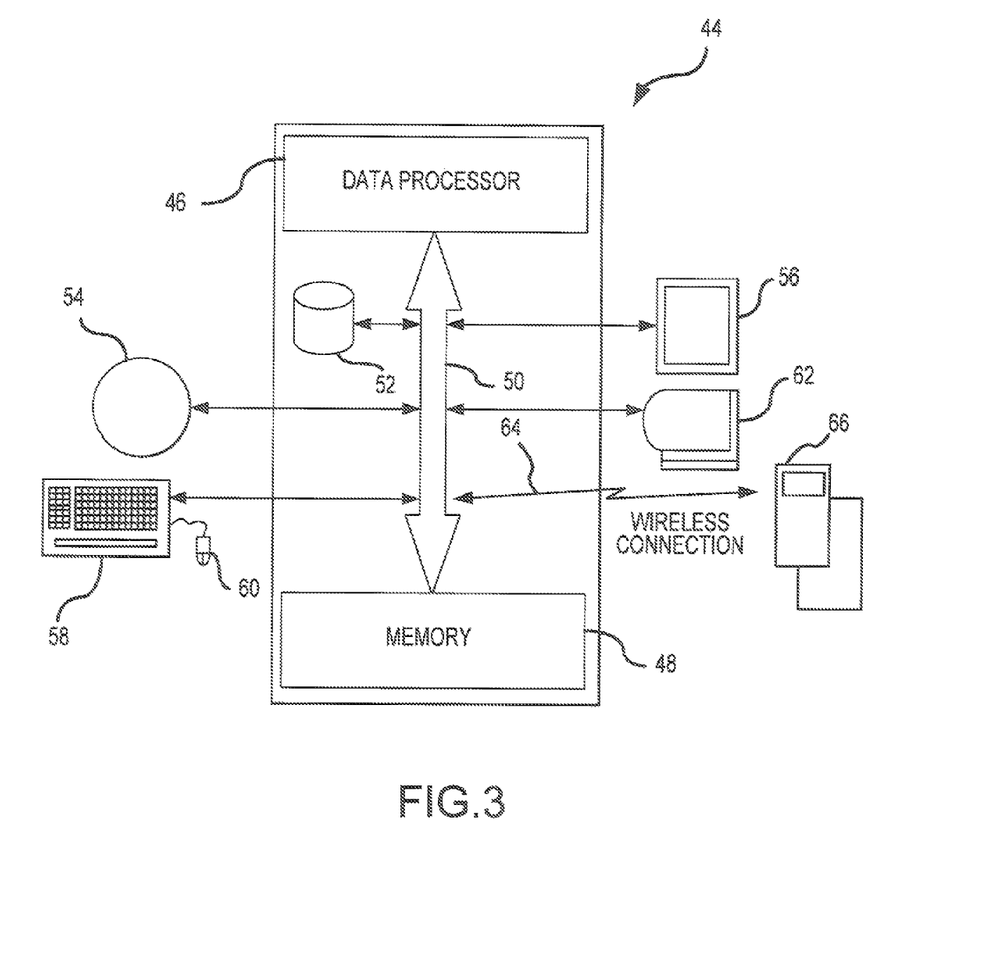
FIG. 3 is a diagrammatic view of components related to a mobile computing platform associated with an integrated wireless equipment management system.

As also illustrated in FIG. 3, the data processing system 44 includes a data processor 46 and a memory 48. A bus 50 connects the data processor 46 and memory 48. Bus 50 is not to be confused with CANbus 22. Accordingly in this document bus 50 will be referred to as the "computer bus 50." Memory 48 is a relatively high-speed machine-readable medium and may include volatile memories such as DRAM, and SRAM, as well as non-volatile memories such as ROM, FLASH, EPROM, EEPROM, and bubble memory. Also correctable to or across computer bus 50 are optional secondary storage 52, external storage 54, and output devices such as a monitor 56 that may be operatively connected to the integrated wireless equipment management system 12. In further optional configurations, an input device such as a keyboard 58 with a mouse 60, and perhaps a printer 62 may be included. Secondary storage 52 may include machine-readable media such as a hard disk drive, a magnetic drum, and bubble memory (not shown). External storage 54 may include, machine-readable media such as a floppy disk, a removable hard drive, a magnetic tape, CS-ROM and even other data, processors (not shown), possibly connected across a communications line 64 to one or more mobile communications devices 66.

The distinction between secondary storage 52 and external storage 54 is primarily for convenience in describing the various components of the data processor 44 possibly used in connection with the method of monitoring CANbus information 10. As such, a person skilled in the art will appreciate that there is substantial functional overlap between and among the components. Data processor software and user programs may be stored in a software storage medium such as memory 48, secondary storage 52, and external storage 54. Executable versions of data processor software can be read from a storage medium such as non-volatile memory, loaded for execution directly into volatile memory, executed directly out of non-volatile memory, or stored in the secondary storage 52 prior to loading into volatile memory for execution.

Those skilled in the art also will appreciate that the various illustrative logical blocks, modules, circuits, and steps described in this document may be implemented as electronic hardware, data processor software, or combination of both. To clearly illustrate this interchangeability of hardware and software, various, illustrative and non-exclusive components, blocks, modules, circuits, and steps have been described in this document generally in terms of their functionality. Whether such functionality is implemented as hardware or software depends on the particular application and design constraints imposed on an overall system. Skilled artisans may implement the described functionality in varying ways for each particular application, but such implementation decisions should not be interpreted as causing a departure from the scope of the present invention.

Likewise, the various illustrative logical blocks, modules, and circuits described in connection with the system for medication management disclosed in this document may be implemented or performed with a general purpose data processor 44, a Digital Signal Processor ("DSP"), an Application Specific Integrated Circuit ("ASIC"), a Field Programmable Gate Array ("FPGA"), or other programmable logic device, discrete gate or transistor logic, discrete hardware components, or any combination thereof, designed to perform the functions described in this document. A general-purpose processor may be a microprocessor, but in the alternative, the processor may be a conventional processor, controller, microcontroller, or state machine. A data processor 44 may also be implemented as a combination of computing devices such as, in a non-exclusive example, a combination of a DSP and a microprocessor, a plurality of microprocessors, one or more microprocessors in conjunction with a DSP core, or any other such configuration.

Those of skill in the art also would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, and/or any combination.

As described and shown above, the CANbus includes one or more original parameters 24a-n usually provided by a manufacturer of vehicle 18. The original parameters 24a-n may be proprietary parameters as configured by a manufacturer of vehicle 18. More specifically, the original parameters 24a-n include one or more parameters defined by SAE standards, including, but not limited to, Standard J1939. Thus, the one or more original parameters 24a-n include a determinable original parameter that provides name and/or description data as illustrated diagrammatically in FIGS. 4A-4C. As defined in this document, the term "determinable original parameter" means at least a parameter that can be determined or ascertained from information available from a vehicle manufacturer.

Thus, the one or more original parameters 24a-n also include a determinable parameter that provides group number data. The one or more original parameters also include determinable suspect parameter number data. As illustrated diagrammatically in FIGS. 4A-4C, the one or more original parameters 24a-n also, include determinable start bit position data of the original parameter 24, as well as determinable total bit data of the original parameters 24a-n.

In addition, although not illustrated, the one or more original parameters 24a-n also include determinable sensor breach data indicating that a sensor has exceeded a configurable threshold value, or value and time combination, and/or limitation, and determinable sensor normal data indicating that a sensor has returned to a configurable threshold value, or to a value and time combination, limitation. As a person of skill in the art will appreciate, a value threshold always exists, during operation, such as temperature, to which may be added a time threshold indicating, for example, that oil pressure has been too low for a period of time.

Figure 4A:
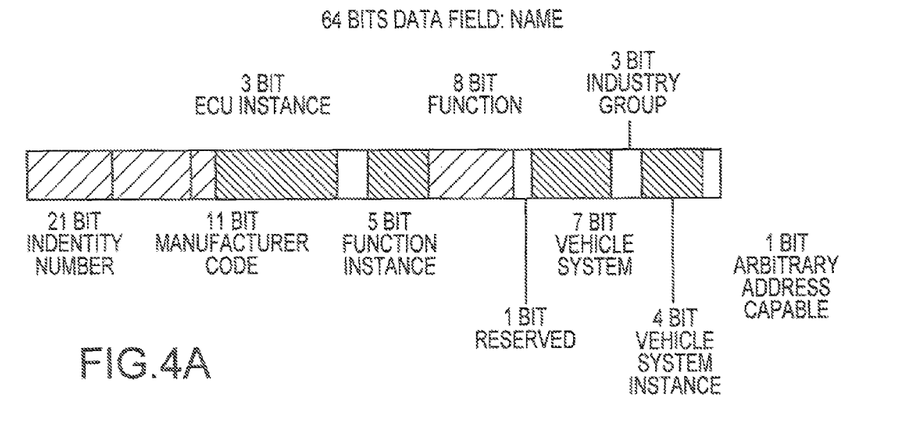
FIGS. 4A-4C are graphical illustrations of message data associated with a CANbus reflecting data bits associated with the J1939 standard.
Figure 4B:
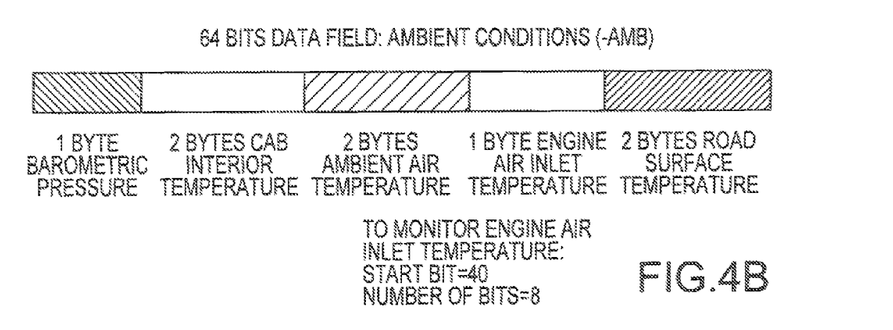
Figure 4C:
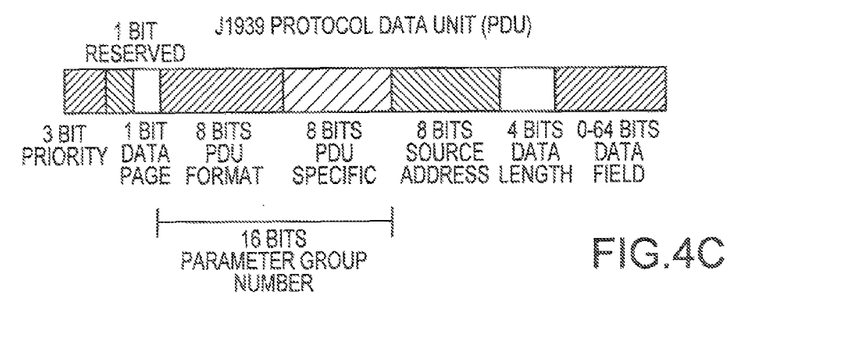

As illustrated in FIGS. 4A-4C, the one or more original parameters 24*a-n* are includable in a message transmittable across the mobile wireless communications system 14 and an integrated wireless equipment management system 12. As also illustrated by cross-reference between FIGS. 4A-4C, particularly in FIG. 4B, parameters in a data field directed to ambient conditions are shown. Also, as also illustrated by cross-reference between FIGS. 4A-4C, particularly in FIG. 4C, the actual J1939 Protocol Data Unit is illustrated showing diagrammatically the concepts of PGN and SA.

As illustrated in FIG. 1A, the integrated wireless equipment management system 12 includes a terminal 20. The terminal 20 is capable of monitoring vehicle data of a remote vehicle 18. The terminal 20 also includes means for providing factor, offset, and unit data to combine with the at least one virtual sensor to provide selective vehicle information, as defined in this document.

The method and system for monitoring CANbus information 10 includes one or more protocols, or programs for using the determinable original parameter name and/or description data, and/or the determinable parameter group number data, author the determinable start bit position data, and/or the determinable total bit data to configure such data and parameters into at least one virtual sensor.

In operation of the method of monitoring CANbus information 10, vehicle operation and performance criteria and parameters may be transmitted across an integrated wireless equipment management system 12 and a mobile wireless communications system 14. Generally, construction equipment manufactures provide a table with specific data about the CANbus 22 of the vehicle 18. Such data may include original parameters 24*a-n* by name and description, a parameter group number ("PGN"), a source address ("SA"), raw breach threshold and hysteresis, starting position and number of bits, units, factor and offset. The user interface allows the asset manager 16 to select a number of predefined "labels." Each label is augmented by the list of parameter names and descriptions provided by the equipment manufacturer. The owner of vehicle 18 and/or asset manager 16 may configure a virtual sensor with some of the same information used in connection with the discrete sensors such as "send alert on breach," or "send alert on normal," among others. Same sensors may he pre-configured when selecting a label by including threshold, hysteresis, and validation times, among others.

Figure 5A:
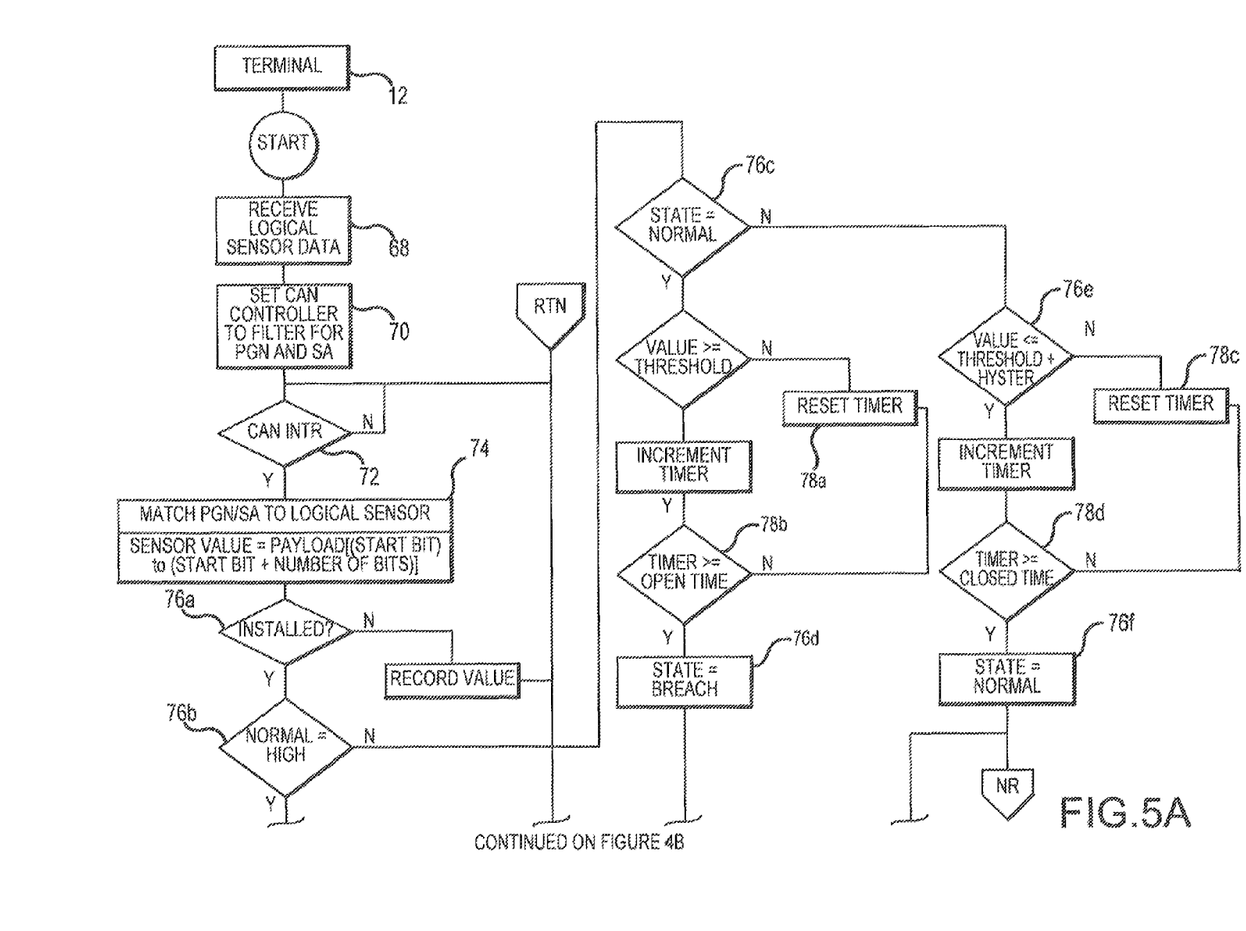
FIG. 5A is a flowchart illustrating at least one sequence of steps in the method of monitoring CANbus information.
Figure 5B:
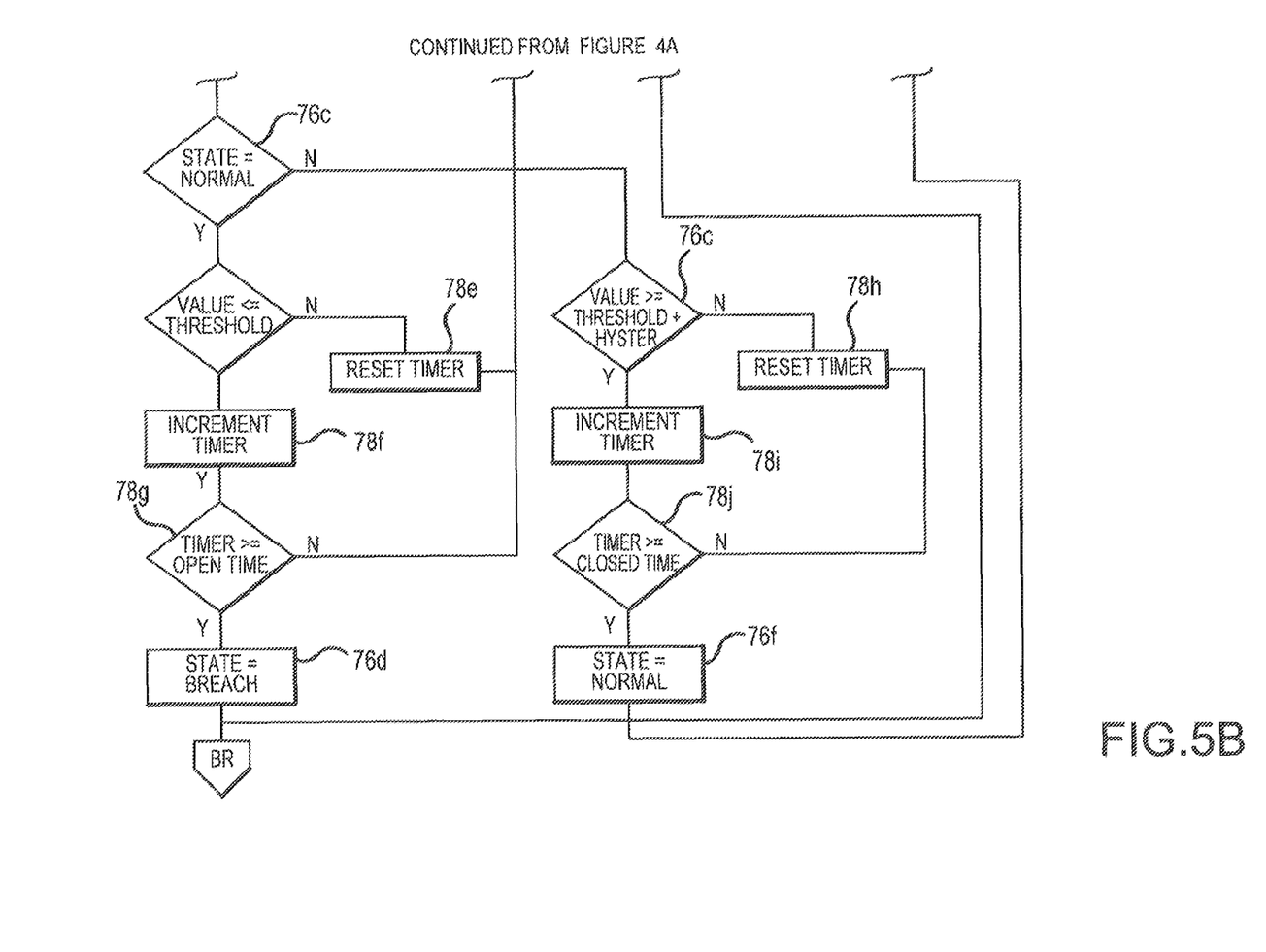
FIG. 5B is a continuation of FIG. 5A illustrating at least one sequence of steps in the method of monitoring CANbus information.
Figure 6:
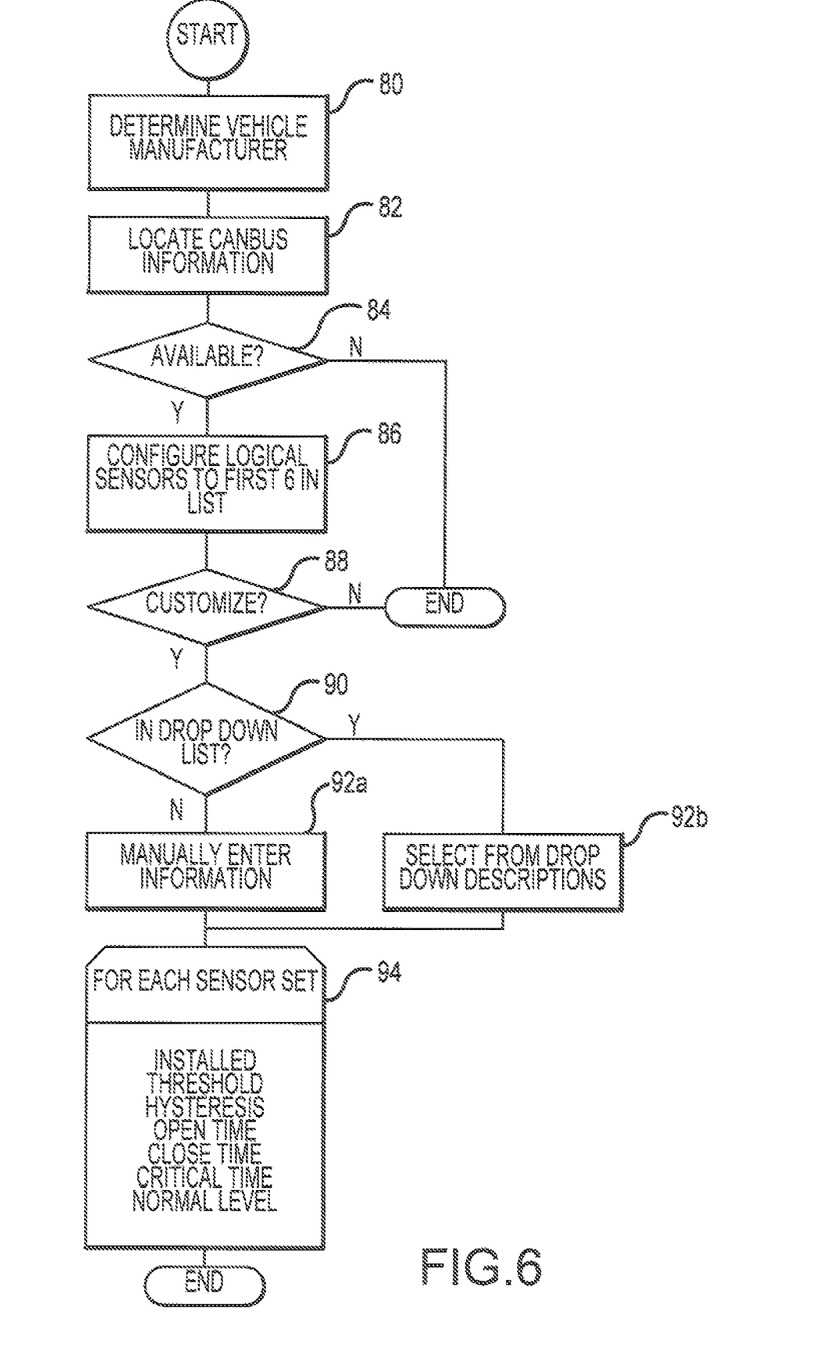
FIG. 6 is a flowchart illustrating at least one aspect of the method of monitoring CANbus information.

As illustrated by cross-reference between FIGS. 4-6, terminal 20 of the integrated wireless equipment management system 12 extracts data coming from the CANbus 22 as a binary number by using the PGN, start bit, and/or number of bits in a data stream. For example, see FIG. 4. Terminal 20 may then apply the discrete sensor logic to the virtual sensor by performing calculations indicating a comparison against a threshold, validations, and alert generations, for example. The terminal 20 also reports on every status of the virtual sensor state. Thus, for example, the terminal 20 reports a breached or normal state, a measured value, whether the accumulated time is breached, the number to times it has breached, and the time and position of the last state change. The customer interface of the asset manager 16 may apply the factor, offset and units to the data received from the terminal 20 to present it in a meaningful form to the used by the asset manager 16.

Accordingly, by adding new parameters to the original parameters 24, a terminal 20 of an integrated wireless equipment management system 12 is able to monitor and act on information on a CANbus 22 without awareness of what type of information is being received or what its original meaning is.

Referring now by cross-reference between FIGS. 5A-5B, the method of monitoring CANbus information 10 is further illustrated in operation. In one aspect, a process of monitoring vehicle operation and performance criteria is disclosed and claimed. As illustrated, the process steps include providing an integrated wireless equipment management system 12. Using the integrated wireless equipment management system 12, the manufacturer of the vehicle 18 is determined. CANbus information in the form of a list is obtained from the manufacturer of the vehicle 18. The user and/or asset manager 16 confirms that the CANbus information includes one or more original parameters.

In operation, as illustrated by cross-reference between FIGS. 5A-6, the process of monitoring vehicle operation and performance criteria includes at least the following steps: At step 68 the terminal 12 of the integrated wireless equipment management system 12 receives vehicle sensor data from the computer assisted components 32 of the asset manager 16. At step 70 the CANbus receiver function, which may provided either by external hardware or a firmware application, is shown and, as shown, is configured with filtered information pertaining to at least PGN, although PGN in combination with SA also may be used. At step 72 the CANbus receiver function further determines if the filtered information illustrated at step 70 in fact received a J1939 frame that was included in the list of PGN's and SA's provided. If it does, then the process proceeds to step 74 at which the PGN and SA are used to determine the logical sensor and, in combination with the information provided by the asset manager 16, to extract the parameter data from the appropriate data field of the received J1939 frame, as illustrated by cross-reference between FIGS. 4A-4C, to match with the filtered vehicle sensor data. After completion of step 74, a state is determined at steps 76*a-f* indicating either a normal or breached state. During steps 76*a-f*, as also illustrated by cross-reference between FIGS. 5A-5B, one or more timers 78*a-j* are reset in response to the state of PGN and SA. The one or more original parameters are configured to a predetermined number of determinable original parameters. To continue to refine the vehicle data, steps 68 through 78 may be repeated for a plurality of vehicle sensor data received from, the CANbus.

As also illustrated in a separate flow chart in FIG. 6, the asset manager at step 80 determines the manufacturer of vehicle 18. At step 82 a table or other source of CANbus information for that vehicle 18 is located. If the table or other source of CANbus information is available at step 84, then one or more original parameters are configured to a predetermined number of determinable original parameters such as 6 at step 86 by customizing one or more original parameters at step 88 to be configured as a customized number of determinable original parameters and assembled at step 90 as a list that at alternative steps 92*a,b* may be either manually entered or, if not, selected from other descriptions to assemble at step 94 for each sensor set the selective vehicle information desired by the asset manager 16.

Claim elements and steps in this document have been numbered solely as an aid in understanding the description. The numbering is not intended to, and should not be considered as intending to, indicate the ordering of elements and steps in the claims. In addition, the method of monitoring CANbus information illustrated in drawing FIGS. 1 through 6 shows at least one aspect of the method of monitoring CANbus information, that is not intended to be exclusive, but merely illustrative of the disclosed embodiments. Any means-plus-function clauses in the claims are intended to cover the structures described as performing the recited function that include not only structural equivalents, but also equivalent structures.

What is claimed is:

1. A method of monitoring bus information, comprising:
receiving one or more original parameters, at an integrated wireless equipment management system, from a bus installed in a vehicle to provide communication and diagnostic information among vehicle components, wherein the one or more original parameters are adapted to provide vehicle information;
receiving a request for desired selective vehicle information from a remote asset manager; and
configuring, at the integrated wireless equipment management system, the one or more original parameters to produce at least one virtual sensor capable of providing selective vehicle information different than the vehicle information included in the original parameters, wherein the configuration of the virtual sensor is based on the received request for desired selective vehicle information.

2. The method of monitoring bus information as recited in claim 1, wherein the one or more original parameters comprise proprietary parameters, from a CANbus, configured by a vehicle manufacturer.

3. The method of monitoring bus information as recited in claim 1, wherein the at least one virtual sensor enables the integrated wireless equipment management system to monitor vehicle data without access to proprietary content of the original parameters.

4. The method of monitoring bus information as recited in claim 1, wherein the one or more original parameters include one or more parameters provided by SAE Standard J1939.

5. The method of monitoring bus information as recited in claim 1, wherein the one or more original parameters include determinable original parameter name and/or description data.

6. The method of monitoring bus information as recited in claim 1, wherein the one or more original parameters include determinable parameter group number data.

7. The method of monitoring bus information as recited in claim 1, wherein the one or more original parameters include determinable suspect parameter number data.

8. The method of monitoring bus information as recited in claim 1, wherein the one or more original parameters include determinable start bit position data of the original parameter.

9. The method of monitoring bus information as recited in claim 1, wherein the one or more original parameters include determinable total bit data of the original parameters.

10. The method of monitoring bus information as recited in claim 1, wherein the one or more original parameters include determinable sensor breach data indicating a value that a sensor has exceeded a configurable threshold value or value and time limitation.

11. The method of monitoring bus information as recited in claim 1, wherein the one or more original parameters include determinable sensor normal data indicating that a sensor has returned to a configurable threshold value or value and time limitation.

12. The method of monitoring bus information as recited in claim 1, wherein the one or more original parameters are includable in a message transmittable across the mobile wireless communications system by a mobile computing platform of the integrated wireless equipment management system to a terminal of the integrated wireless equipment management system.

13. The method of monitoring bus information as recited in claim 1, wherein a determinable original parameter name and/or description data, and/or a determinable parameter group number data, and/or a determinable start bit position data, and/or a determinable total bit data are configurable at a terminal of the integrated wireless equipment management system into the at least one virtual sensor.

14. The method of claim 1, further comprising receiving a virtual sensor configuration that defines the at least one virtual sensor from a remotely-located asset manager computer-assisted component.

15. The method of claim 1, wherein the selective vehicle information is a function of the at least one virtual sensor and at least one of factor, offset, and unit data.

16. The method of claim 1, wherein configuring the one or more original parameters to produce the at least one virtual sensor further comprises at least one of:
extracting data from the one or more original parameters according to a virtual sensor configuration received from a remotely-located asset manager computer-assisted component; or
adding new parameters to at least one of the extracted data or the one or more original parameters, according to the virtual sensor configuration.

17. The method of claim 1, wherein the desired selective vehicle information is received in a message via a mobile wireless communication system by a mobile computing platform of the integrated wireless equipment management system.

18. The method of claim 1, further comprising reconfiguring, at the integrated wireless equipment management system, the one or more original parameters to produce at least one virtual sensor capable of providing different selective vehicle information.

19. The method of claim 1, wherein the original parameters comprise parameters provided for use with a CANbus by a manufacturer of the vehicle.

20. A method of monitoring bus information comprising:
receiving one or more original parameters at an integrated wireless equipment management system adapted to receive, store, and process at least vehicle data across a mobile wireless communications system, from a bus installed in a vehicle, wherein the bus is adapted to provide communication and diagnostic information among vehicle components the bus being operatively connectable to the integrated wireless equipment management system, wherein the bus includes the one or more original parameters adapted to provide vehicle data that may be monitored by the integrated wireless equipment management system;
configuring the one or more original parameters to produce at least one virtual sensor capable of providing selective vehicle information to the integrated wireless equipment management system; and
transmitting a message including the one or more original parameters across the mobile wireless communications system by a mobile computing platform of the integrated wireless equipment management system to a terminal of the integrated wireless equipment management system, wherein the terminal of the integrated wireless equipment management system further comprises means for providing factor, offset, and unit data to combine with the at least one virtual sensor to provide the selective vehicle information.

21. The method of monitoring bus information as recited in claim 20, wherein the one or more original parameters include one or more parameters provided by SAE Standard J1939.

22. A system for processing original parameters of a CANbus as virtual sensors, comprising:
an integrated wireless equipment management system having at least one terminal adapted to monitor vehicle data of a vehicle, wherein the at least one terminal is configured to:
receive one or more original parameters from a CANbus mounted in the vehicle and adapted to provide communication and diagnostic information among vehicle components, wherein the one or more original parameters are adapted to provide vehicle information; and
receive a request for desired selective vehicle information from a remote asset manager; and
a terminal processor configured to execute at least one protocol for configuring the one or more original parameters to produce at least one virtual sensor capable of providing selective vehicle information different than the vehicle information included in the original parameters, wherein the configuration of the virtual sensor is based on the received request for desired selective vehicle information.

23. The system for processing original parameters of a CANbus as virtual sensors as recited in claim 22, wherein the one or more original parameters correspond to one or more sensors on the vehicle that are operatively connected to the CANbus.

24. The system for processing original parameters of a CANbus as virtual sensors as recited in claim 22, further comprising a mobile computing platform operatively connectable to the terminal, wherein the mobile computing platform is configured to receive and transmit messages across a mobile wireless communications system to other components of the integrated wireless equipment management system.

25. The system for processing original parameters of a CANbus as virtual sensors as recited in claim 22, wherein the at least one protocol for configuring the one or more original parameters to selective vehicle information defines a plurality of determinable original parameters.

26. A system for processing original parameters of a CANbus as virtual sensors, comprising:
an integrated wireless equipment management system having at least one terminal adapted to monitor vehicle data of a vehicle, wherein the at least one terminal is configured to receive one or more original parameters from a CANbus mounted in the vehicle and adapted to provide communication and diagnostic information among vehicle components, wherein the one or more original parameters are adapted to provide vehicle information; and
a terminal processor configured to execute at least one protocol for configuring the one or more original parameters to produce at least one virtual sensor capable of providing selective vehicle information different than the vehicle information included in the original parameters,
wherein the terminal processor configured to execute the at least one protocol for configuring the one or more original parameters to selective vehicle information is further configured to extract one or more parameters provided by at least one standard adopted by the Society of Automotive Engineers from the one or more original parameters and configure one or more determinable parameters from the one or more extracted parameters, wherein the one or more determinable parameters correspond to the at least one virtual sensor.

27. A system for processing original parameters of a CANbus as virtual sensors comprising:
an integrated wireless equipment management system having at least one terminal remote from a vehicle adapted to monitor vehicle data of the vehicle transmitted from a mobile computing platform to the at least one terminal, wherein the remote terminal is configured to receive vehicle data messages from the mobile computing platform provided at the vehicle via a mobile wireless communications system adapted to transmit vehicle data messages at least between the mobile computing platform and the at least one terminal, and wherein the vehicle data messages are received from a CANbus mounted in the vehicle adapted to monitor vehicle data transmittable in vehicle data messages between the mobile computing platform and the at least one terminal, wherein the CANbus includes one or more original parameters; and
at least one protocol for configuring the vehicle data in the vehicle data messages to provide selective vehicle information monitored by the at least one terminal, wherein the protocol for configuring the vehicle data to provide selective vehicle information includes factor, offset and unit data provided by the terminal.

28. A system for providing selective vehicle information, the system comprising:
means for receiving one or more original parameters, from a CANbus mounted in a vehicle to provide communication and diagnostic information among vehicle components, wherein the one or more original parameters are adapted to provide vehicle information;
means for receiving a request for desired selective vehicle information from a remote asset manager; and
means for configuring the one or more original parameters to produce at least one virtual sensor capable of providing selective vehicle information different than the vehicle information included in the original parameters, wherein the configuration of the virtual sensor is based on the received request for desired selective vehicle information.

29. The system for providing selective vehicle information as recited in claim 28, wherein the means for configuring further includes means for filtering the one or more original parameters to obtain a parameter group number (PGN) and a source address (SA).

30. The system for providing selective vehicle information as recited in claim 29, wherein the means for configuring further comprises means for matching the PGN and the SA with the one or more original parameters.

31. The system for providing selective vehicle information as recited in claim 30, further comprising means for determining whether the PGN and the SA are normal or breached.

32. A system for monitoring bus information, comprising:
an integrated wireless equipment management system adapted to:
receive at least vehicle data including one or more original parameters from a bus installed in a vehicle to provide communication and diagnostic information among vehicle components, wherein the one or more original parameters are adapted to provide vehicle information; and
receive a request for desired selective vehicle information from a remote asset manager; and a processor adapted to configure the one or more original parameters to produce at least one virtual sensor capable of providing selective vehicle information different than the vehicle information included in the original parameters, wherein the configuration of the virtual sensor is based on the received request for desired selective vehicle information.

33. A computer program product, comprising a non-transitory computer-readable medium storing instructions that cause a computer to monitor bus information when executed by the computer, the instructions for causing the computer to:

receive one or more original parameters from a bus installed in a vehicle to provide communication and diagnostic information among vehicle components, wherein the one or more original parameters are adapted to provide vehicle information;

receive a request for desired selective vehicle information from a remote asset manager; and configure the one or more original parameters to produce at least one virtual sensor capable of providing selective vehicle information different than the vehicle information included in the original parameters, wherein the configuration of the virtual sensor is based on the received request for desired selective vehicle information.

* * * * *